INVENTORS
JOHN A. LISOWSKI
BY FRANK B. LISOWSKI
ATTORNEYS

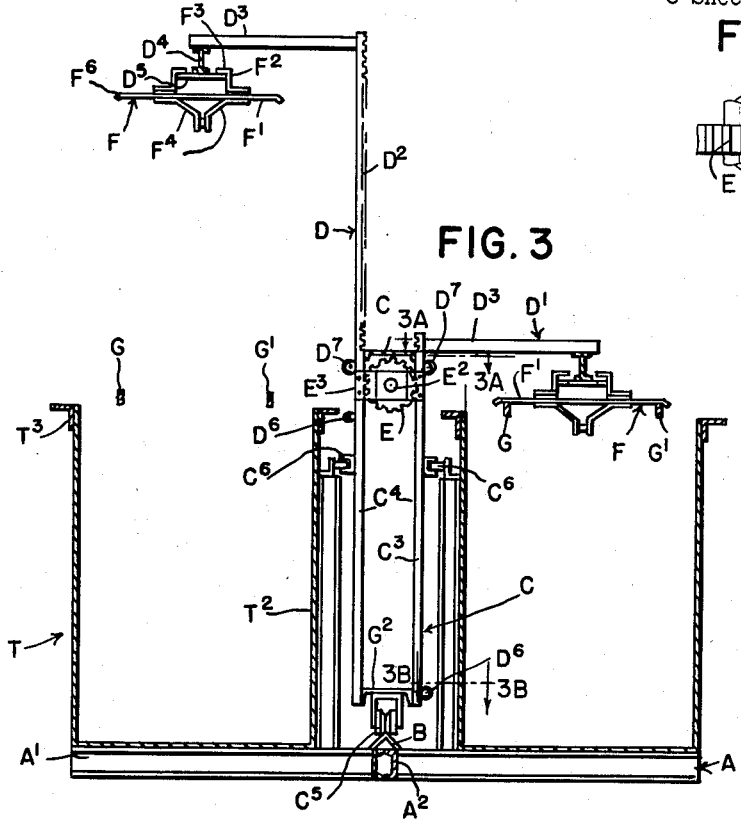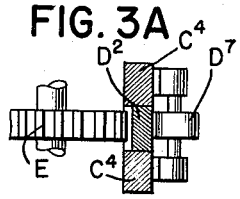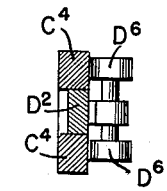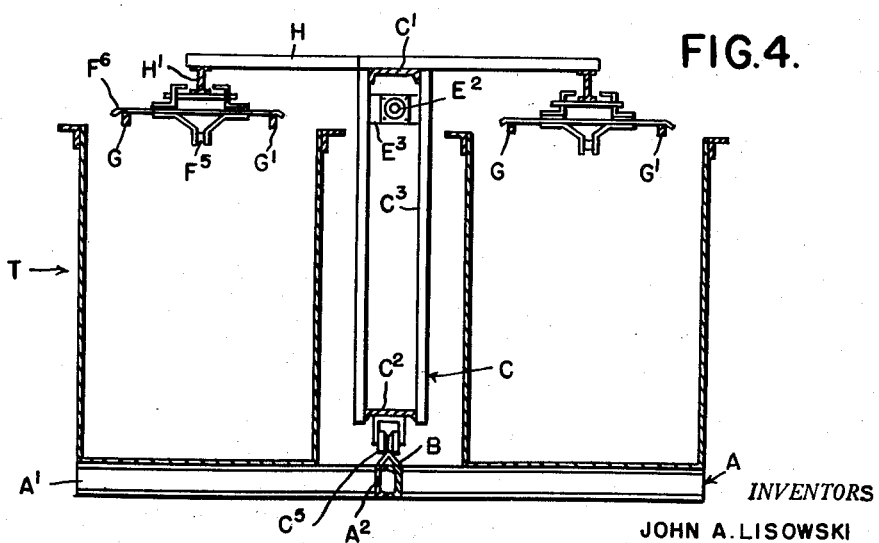

Aug. 19, 1958  J. A. LISOWSKI ET AL  2,848,405
APPARATUS FOR HANDLING AND CONVEYING WORK
Filed April 30, 1953  6 Sheets-Sheet 3
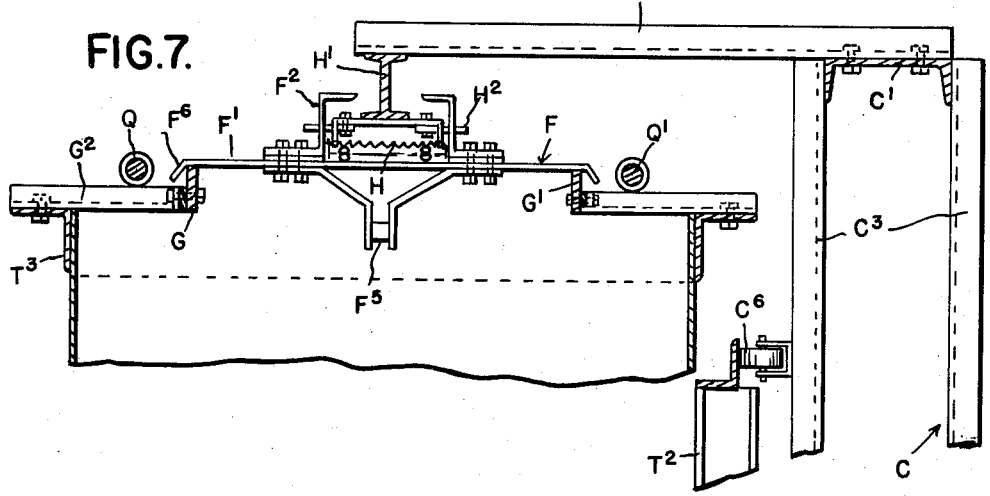
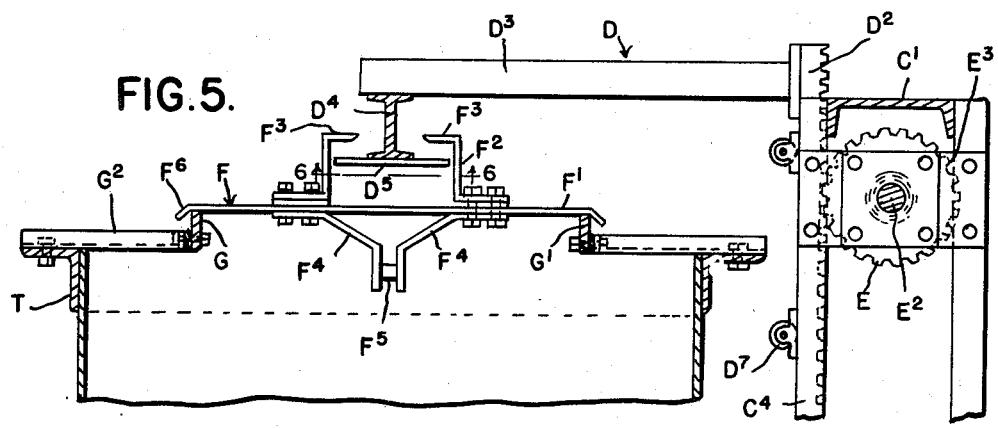
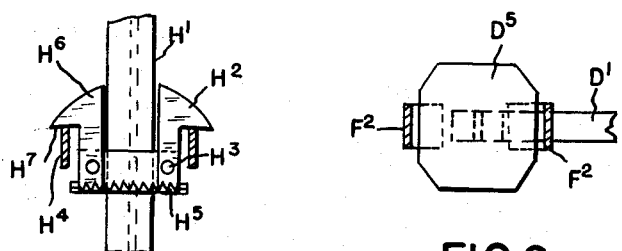
INVENTORS
JOHN A. LISOWSKI
BY FRANK B. LISOWSKI
*Whittemore Halbert & Belknap*
ATTORNEYS Aug. 19, 1958

J. A. LISOWSKI ET AL 2,848,405

APPARATUS FOR HANDLING AND CONVEYING WORK

Filed April 30, 1953

INVENTORS
JOHN A. LISOWSKI
FRANK B. LISOWSKI
BY

*Whittemore Hulbert Belknap*

ATTORNEYS

Aug. 19, 1958  J. A. LISOWSKI ET AL  2,848,405
APPARATUS FOR HANDLING AND CONVEYING WORK
Filed April 30, 1953  6 Sheets-Sheet 6

INVENTORS
JOHN A. LISOWSKI
BY FRANK B. LISOWSKI

ATTORNEYS

United States Patent Office 2,848,405
Patented Aug. 19, 1958

2,848,405

APPARATUS FOR HANDLING AND CONVEYING WORK

John A. Lisowski and Frank B. Lisowski, Detroit, Mich., assignors to Natural Products Company, Newport, Mich., a copartnership Application April 30, 1953, Serial No. 352,165

17 Claims. (Cl. 204—203)

The invention relates to apparatus for the automatic handling of work which is to be processed at each of a series of stations, for successively transferring it from station to station with the avoidance of obstructions therebetween, and for also advancing it step by step at any station where a longer time of treatment is required. More particularly the apparatus is adaptable to the process of electroplating in which the parts to be plated must undergo successive treatments in a series of tanks. It is the object of the invention to obtain a simple and relatively inexpensive construction which has many advantageous features including conservation of floor space, elimination of heavy and costly superstructure, minimum requirement for ceiling height, minimum length in comparison with the total length of path through which the work is conveyed and other advantages as hereinafter set forth. To this end the invention consists in the construction as hereinafter described.

While our invention may be used advantageously in connection with various processes we will specifically describe its application to an electroplating process.

In the drawings:

Fig. 3 is a transverse section on line 3—3, Fig. 1;

Fig. 3A is a cross-section on line 3A—3A, Fig. 3;

Fig. 3B is a cross-section on line 3B—3B, Fig. 3;

Fig. 4 is a similar section on line 4—4, Fig. 1;

Fig. 5 is a view similar to a portion of Fig. 3;

Fig. 6 is a horizontal section on line 6—6, Fig. 5;

Fig. 7 is a view similar to a portion of Fig. 4;

Fig. 8 is a horizontal section on line 8—8, Fig. 7;

Figure 1:
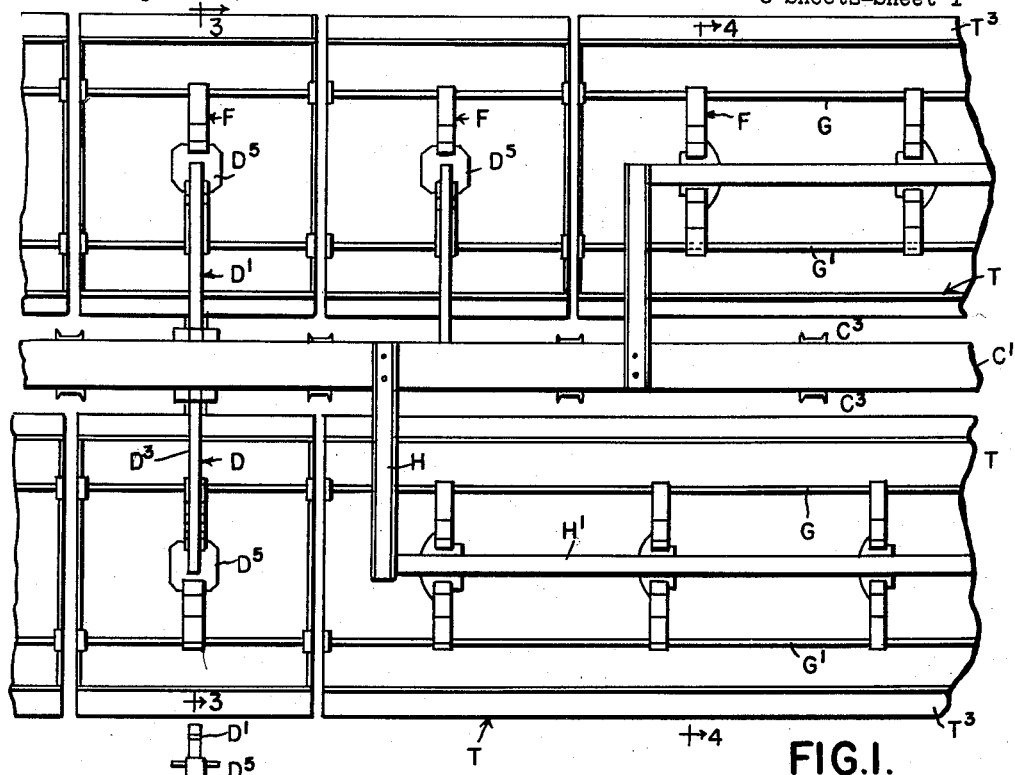
Fig. 1 is a plan view of a portion of the apparatus which may be extended in accordance with the particular requirements of the process.
Figure 2:
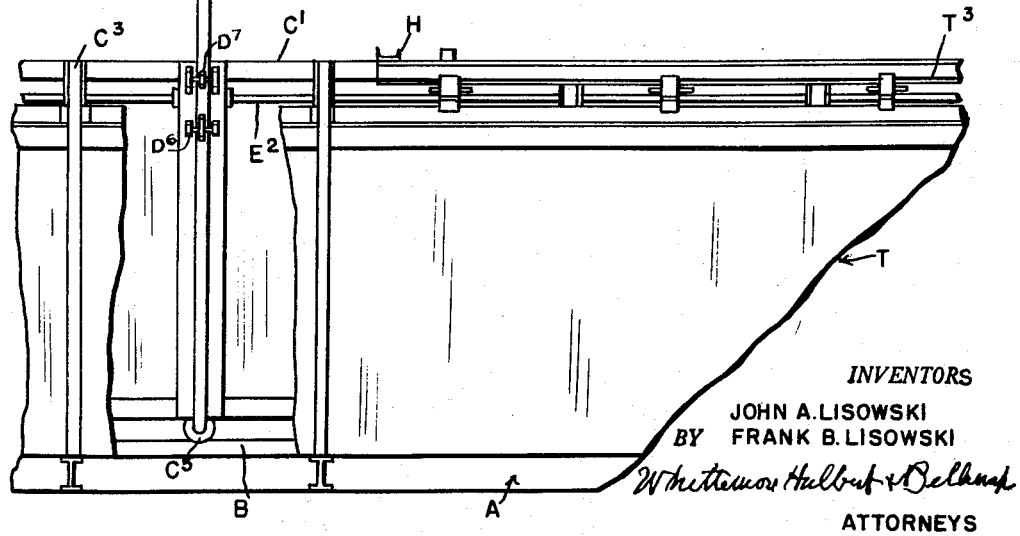
Fig. 2 is a side elevation.
Figure 10:
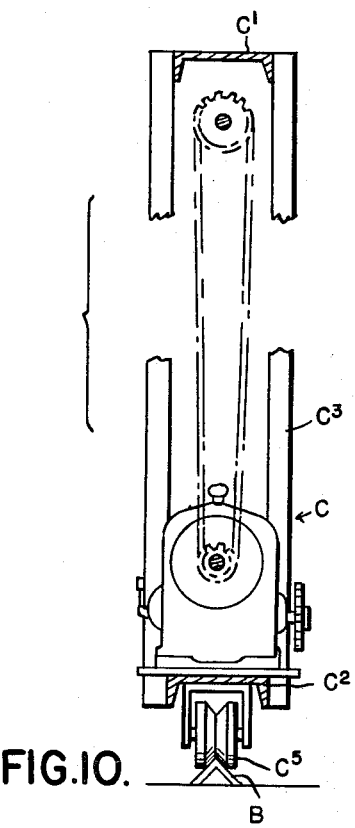
Fig. 10 is an elevation viewed at right angle to Fig. 9.
Figure 9:
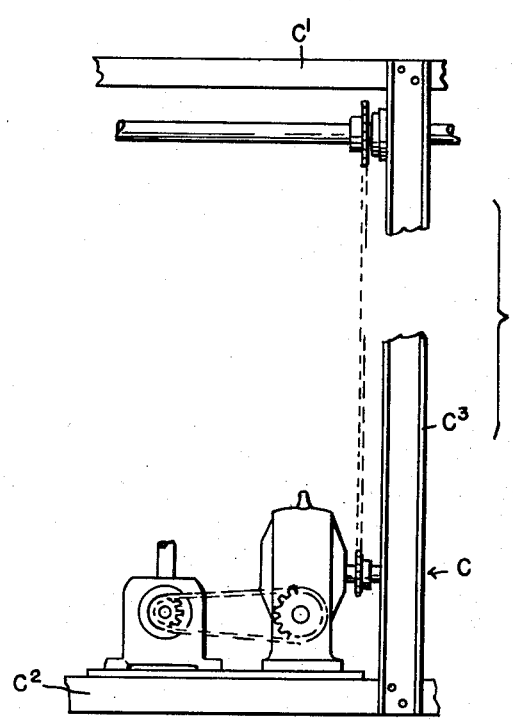
Fig. 9 is an elevation of the shaft actuating mechanism.
Figure 11:
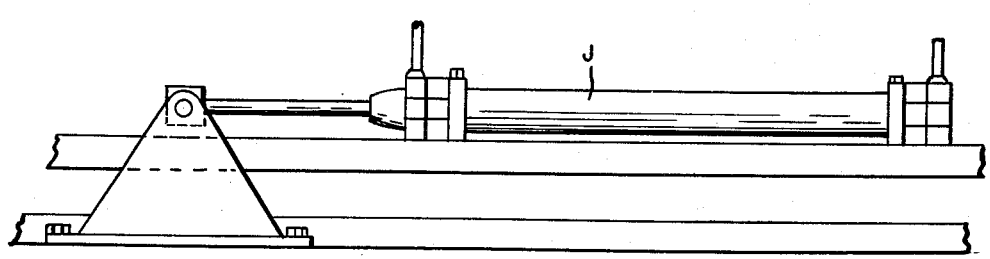
Fig. 11 is an elevation of the carriage operating motor.

Generally described our improved apparatus comprises a structure which may be located between fairly closely spaced rows of tanks T in which the successive steps of the process are performed. The tanks may be placed on a supporting base A formed of I-beams or beams of other structural shape including cross beams A' between adjacent tanks and a central longitudinally extending beam $A^2$ between the adjacent rows of tanks. The latter has mounted thereon a track B which may be formed of angle bars with the apex of the angle extending centrally upward. Supported on this track for reciprocal travel thereon through a limited distance is a carriage C. This comprises top and bottom longitudinally extending bars $C'$ and $C^2$ preferably of channel cross section and vertically extending bars $C^3$ connecting the same at spaced intervals and upon opposite sides thereof. These bars which are attached to each other, preferably by welding, form a rectangular open frame which extends substantially the entire length of the rows of tanks and may be added to if additional tanks are introduced in the series. Mounted on the carriage at suitable intervals and upon opposite sides of the frame are elevators D and D', each of which is capable of vertical travel to an extent sufficient for lowering the work into a tank and for raising it to clear the top when it is to be transferred to an adjacent tank. Each elevator comprises a rack bar $D^2$ which is placed between and guided by adjacent vertical frame bars $C^4$, which latter are bolted or otherwise secured to the top and bottom bars $C'$ and $C^2$. Each rack bar is in mesh with a gear wheel E mounted on a longitudinally extending shaft $E'$ journaled in bearings $E^2$ on cross bars $E^3$ of the frame. If a pair of elevators D and D' are in the same transverse plane, each rack bar thereof is in mesh with the same gear E so that when one rack bar is elevated by the rotation of said gear the other one is simultaneously depressed and vice versa. Each elevator has projecting laterally from its upper end a cantilever arm $D^3$ which extends to at least the center of the tank over which it is placed and which is used for the step by step advancement of work suspending members F detachably engaged by the outer end of said bar. Each of the members F includes a bar $F'$ extending transversely of the tank and adapted to rest upon longitudinally extending supporting rails G and $G'$. The latter are mounted upon and extend longitudinally over each tank T of the series in alignment with each other. The coupling means between the arms $D^3$ and the member F is such as to be automatically engaged or disengaged when the elevator is in its lowermost position. With the specific construction illustrated this coupling means comprises a short length bar $D^4$ secured to and beneath the arm $D^3$ at the outer end thereof and having secured to the bottom thereof a plate $D^5$ which parts may be attached to each other by welding. The member F has secured to the upper face of the bar $F'$ thereof a pair of Z-shaped brackets $F^2$ which are spaced to embrace the plate $D^5$ with their inwardly extending flanges $F^3$ overlapping said plate. The bar $F'$ is also provided on its lower side with a pair of spaced bracket members $F^4$ which may be secured to the bar by the same bolts which attach the members $F^2$. A pin $F^5$ extending between the lower ends of the brackets $F^4$ is adapted to be engaged by a hook for attaching the work thereto.

With the construction as thus far described it will be understood that the elevators on one side of the carriage will be depressed when the elevators on the other side are raised and that when actuated they will be moved simultaneously in opposite directions. It may also be assumed (as will be later described) that the carriage when actuated will travel a distance equal to the minimum distance between centers of adjacent tanks and that the elevators are spaced on the carriage an equal distance and are operated only when the carriage is stationary and at opposite ends of its reciprocal movement. Starting the cycle with the operation of the elevators and tracing the movement of one of the depressed arms $D^3$, this arm has its plate $D^5$ between the brackets $F^2$ of one of the work holders F. When the arm moves upward the plate $D^5$ engaging the flanges $F^3$ will lift the holder F with its suspended work so as to clear the top of the tank. The carriage will then be advanced to transport the suspended work from the tank in which it was immersed to a position above the next adjacent tank. Movement of the carriage will then cease and the elevator will be operated to depress the arm immersing the work in the fluid of the tank and resting its holder F upon the supporting rails G and G'. In this position the plate D⁵ will be free of its load so that during initial return movement of the carriage it will be disengaged from the holder F, and during its final movement will be coupled to another holder F which has been deposited on the rails by another arm D³, this completing the cycle. During this same cycle the arm of the companion elevator, which was in its raised position projecting over the other row of tanks, will first be depressed to deposit on the rails G and G' any holder F previously engaged therewith, after which this arm will travel with the movement of the carriage disengaging from the deposited holder and engaging with another holder F at the completion of the carriage movement. The latter holder will then be elevated, transported to another tank while in its elevated position, and lowered to be deposited on the rails with the work immersed in the tank. In brief, the work will be transported in one direction with respect to one row of tanks and in the opposite direction with respect to the other row of tanks.

Elevators

As previously described, each elevator comprises a rack bar D² placed between guide bars C⁴ which are bolted to the frame of the carriage C. To hold the rack bars between said guide bars during upward and downward travel a pair of rollers D⁶ mounted upon the lower end of the rack bar bear against the outer face of the guides C⁴ and a roller D⁷ mounted on the upper ends of said guides C⁴ bears against the outer faces of the rack bar. These roller bearings are sufficient to take care of any stresses due to the load suspended from the outer end of the arm D³. The gear wheel E which is in mesh with both rack bars of the companion pair of elevators and which is actuated by the shaft E' functions to move the elevators in opposite directions when the shaft is rotated by means later described.

Carriage

During the vertical movements of the elevators the loads carried by the oppositely extending arms D³ substantially counterbalance each other and are supported on the track B. This track, which as previously described is of inverted V cross-section, is engaged by rollers C⁵ secured at certain intervals to the lower frame bar C² of the carriage C. The rollers have V grooves therein for engaging the track to prevent lateral displacement. It is however necessary to guide the upper portion of the carriage which is preferably accomplished by rollers C⁶ mounted on frame bars C³ on opposite sides of the carriage and engaging guide tracks T'. These tracks, as shown, are mounted on the upper ends of posts T² adjacent to the walls of the tanks in each row. Thus, the load of the tanks forms an anchorage for the guide tracks T' and prevents any tipping of the carriage to either one side or the other.

Work supporting means

The rails G and G', previously mentioned, extend longitudinally over each tank and are preferably supported by bars G² extending inwardly from the side walls of the tank. These bars may be secured to angle bars T³ reinforcing the upper ends of the tanks. The rails are secured to the inner ends of the bars and in case these rails are used for conveying electric current they are insulated from the bars by any suitable means. However on those tanks in which there is no electrical treatment the rails may be secured without insulation. The work suspension holders F rest upon the rails and the opposite ends of the bars F' of these holders are turned downward as at F⁶ to secure the holders from lateral displacement. In the tanks in which the work is plated or otherwise electrically treated the rails G and G' are electrified and may constitute either anode or cathode connections. The bars F' of the holders will convey the current to the pins F⁵ and through the hooks engaging the latter to the work. It is however necessary to prevent short circuiting through the couplings to the arms D³, which may be accomplished by insulating the Z-shaped brackets F² in their attachment to said bar F'. The connections to the source of electrical current are not fully shown. However, conductors Q and Q' supported upon but insulated from the bars G² may be either positive leads with anodes suspended therefrom extending into the electrolyte in the container in case the work forms the cathode or negative leads with cathodes similarly suspended therefrom in case the work is the anode.

Additional work advancing means

The processing which is carried out in some of the tanks of the series may require more time than that of the cycle previously described. Such additional time may be provided by increasing the length of such tanks and positioning the elevators in relation thereto so that one elevator introduces the work into the tank and another elevator at the opposite end of the tank removes it. Between these two elevators the work may be advanced over the rails G and G' by the following mechanism:

H are arms secured to the upper carriage frame bar C' and projecting over the long tanks between the elevators at the opposite ends thereof. The arms H are connected to each other by a longitudinally extending beam H' which is positioned in a horizontal plane corresponding to that of the bars D⁴ in the lower position of the arms D³. Mounted on this beam H' are latch dogs H² adapted to engage the brackets F² of the holders F resting on the rails G and G' to advance said holders in one direction along said rails. As shown in Fig. 8 the latch dogs H² are pivoted at H³ to a cross-member H⁴ secured to the underside of said beam H' and are resiliently connected at one side of the pivot by a spring H⁵. Their opposite ends have cam portions H⁶ and shoulders H⁷ adjacent said cams. The construction is such that when the beam H' travels rearward with respect to the direction in which the work is transported by the elevators the cams H⁶ engaging the spaced brackets F² will turn the latch dogs H² on their pivots and permit them to pass between said brackets to engage the shoulders H⁷ with the rear ends thereof. In the reverse movement of the carriage and the beam H' the holder F will be advanced over the rails and this movement is repeated step by step in successive reciprocations of the carriage. The amount of advancement in each step depends upon the positioning of the latch dogs on the beam H' so as to give a greater or less amount of lost motion before engagement of the shoulders H⁷ with the brackets F². In this way the time in which the work remains in the tank may be adjusted as required.

Motivating means

Figure 12:
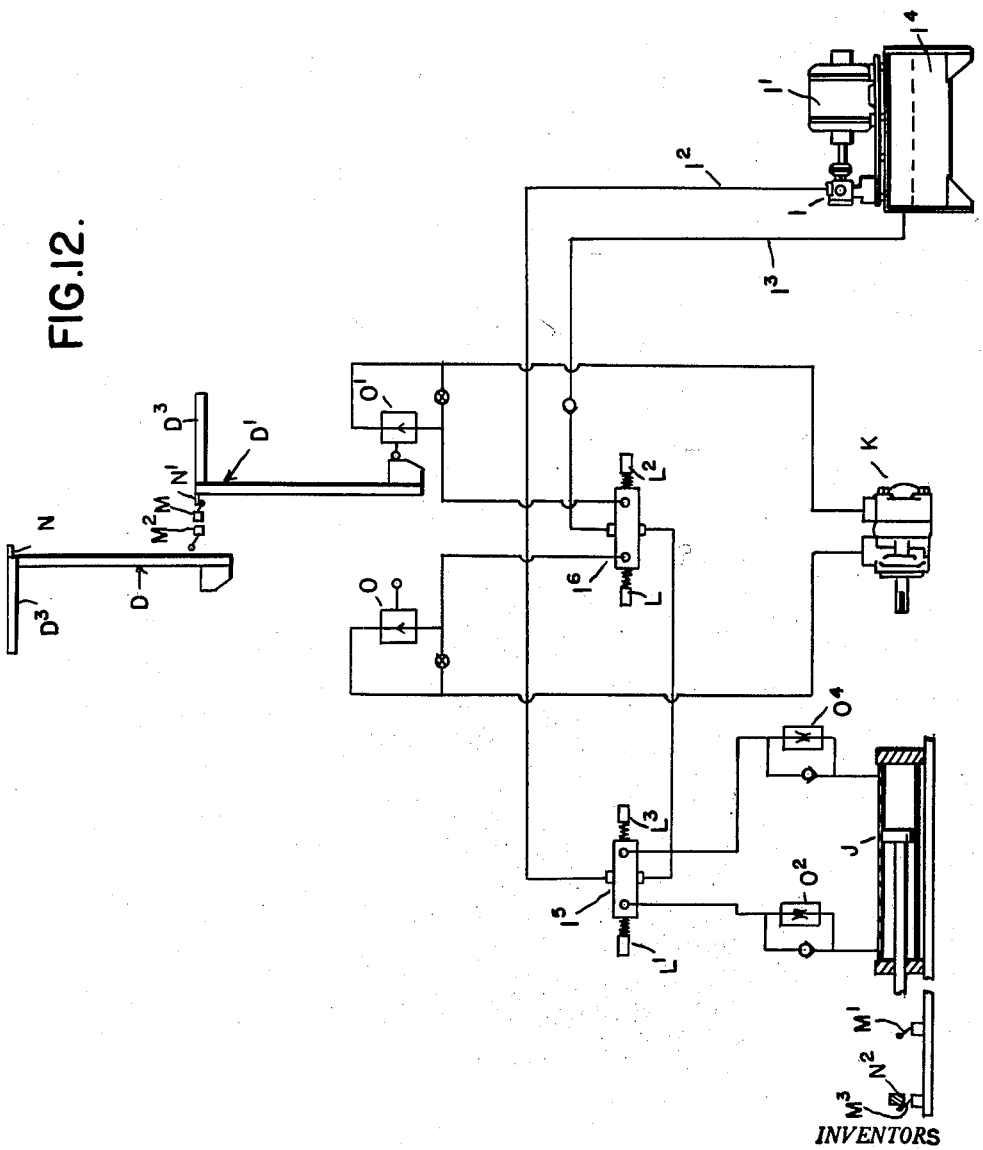
Fig. 12 is a diagram of the hydraulic operating system.

The mechanism operating in the cycle as above described can be actuated by any suitable motivating means. Preferably it is actuated hydraulically and is controlled electrically. It will be unnecessary to describe in detail such motivating and controlling mechanism which is similar to that used with many mechanisms in the prior art. Generally described a hydraulic pump I is driven by an electric motor I' to propel fluid through a circuit having an outgoing conduit I² and return conduit I³, the latter leading to a supply tank I⁴. The hydraulic circuit includes electrically operated valve members I⁵ and I⁶ respectively controlling a piston motor J for actuating the carriage C and a reversible rotary motor K for intermittently rotating the shaft E' alternately in opposite directions. Each of these valve members has a neutral position in which the fluid of the circuit flows freely therethrough, also positions for directing fluid to the corresponding motor for actuating it respectively in opposite directions. The electrically operating means is not fully illustrated but includes solenoids L, L', L², and L³ and limit switches M, M', M², and M³. The limit switch M is actuated by the completion of the downward movement of one of the elevators (D' to the right, Fig. 12), deenergizing the solenoid L which restores the valve member I⁶ to neutral position and simultaneously energizing the solenoid L', which actuates the valve member I⁵ to a position for operating the piston motor J towards the right, Fig. 12, this moving the carriage C in a corresponding direction. The limit switch M' is operated at completion of said movement of the carriage to deenergize the solenoid L' and simultaneously energize the solenoid L², which latter operates the valve member I⁵ to actuate the motor K in a direction to raise the elevators D' and lower the elevators D. The limit switch M² is operated at the completion of the downward movement of one elevator D to deenergize the solenoid L² and to energize the solenoid L³ which moves the valve I⁵ into position to actuate the motor J to the left, returning the carriage and completing the cycle. Fingers N and N' on the elevators D and D' actuate the limit switches M and M² and a stationary finger N² operates the limit switches M' and M³, which latter are mounted on the carriage or other part of the reciprocating mechanism. The system may also be provided with suitable control means for retarding both motors J and K before completion of movement in one direction to avoid inertial shocks, said means being indicated at O, O', O², and O³ (Fig. 12).

In the complete apparatus the two rows of tanks may form a single series, the work being advanced intermittently from tank to tank of one row and then transferred to the other row and advanced therein intermittently in the opposite direction. On the other hand each of the two rows of tanks may constitute a complete series differing from each other only in the direction in which the work is advanced.

Figure 13:
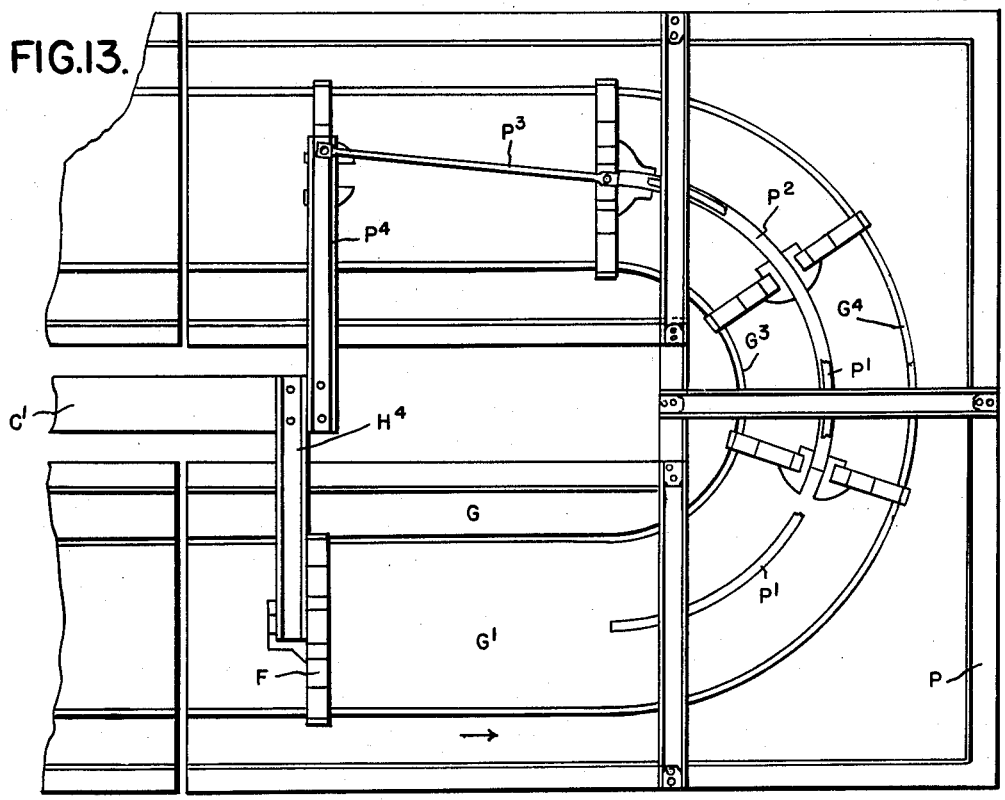
Fig. 13 is a plan view of the transfer mechanism for the work from the last tank of the first row to the first tank of the return row.
Figure 14:
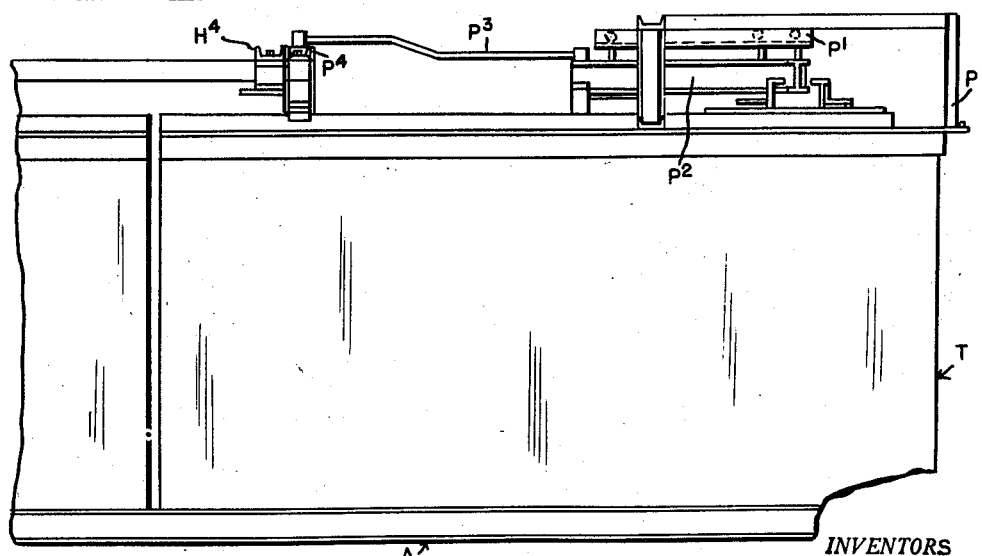
Fig. 14 is a side elevation thereof.

In Figs. 13 and 14 there is illustrated respectively in plan view and in side elevation a transfer mechanism for the work from one row to the other, said mechanism being of the following construction:

The rails G and G' over the last tank of the first row are connected by arcuate rails G³ and G⁴ to the rails G and G' over the first tank of the return row. There is also supported upon a suitable framework P an arcuate guide rail P' which is centrally between the rails G³ and G⁴ and located in a horizontal plane above the same. Slidably supported on the rail P' is an arcuate carriage P² of lesser length and which has mounted thereon pairs of latch dogs H² at spaced intervals, similar in construction to those previously described. The carriage P² is pivotally connected to a rod P³, which in turn is connected to an arm P⁴ extending laterally from the rear end of the carriage C over the return row of tanks. Thus, in the forward movement of the carriage C in the direction of the arrow, Fig. 13, the rod P³ will move the carriage P² on the rail P' from a position adjacent to the first tank in the return row to a position adjacent the last tank of the first row. During this movement of the main carriage C an arm H thereof projecting laterally over the first row will advance one of the work holders F to a position where it will be engaged by one pair of latch dogs H² on the arcuate carriage P². During the return movement of the main carriage C the arcuate carriage P² will advance this work holder F a certain distance over the arcuate rails G³ and G⁴ to a position indicated at 1, Fig. 13. A succeeding reciprocation of the carriage will advance the holder F to another position on the arcuate rails G³ and G⁴, indicated at 2, Fig. 13. A third reciprocation will advance the holder F to a position over the rails G and G' of the first tank in the return row from which it will be advanced by mechanism previously described along this row. Thus, both rows of tanks form a single series, the work being automatically transferred from the last tank of the first row to the first tank of the return row.

What we claim as our invention is:

1. Work holding and conveying means comprising a carriage adjacent and parallel to a row of work processing stations extending substantially the length of said row and intermittently movable back and forth for a limited distance, elevators mounted on said carriage opposite said stations each including a vertical rod movable upward above said carriage, an arm projecting from the upper end of each rod laterally over the adjacent station, a plurality of work suspension holders, supporting means at said station for said holders, means on each arm for automatically coupling with and uncoupling from a work holder while said work holder is resting upon said supporting means during portions of the movement of said carriage, and mechanism for intermittently and alternately actuating said carriage and elevators timed to, first, simultaneously move upward all elevators which are coupled to work suspension holders, raising the latter off from said supporting means, second, to advance said carriage thereby transferring said raised holders from one station to another, third, to lower said raised elevators to deposit said holders on said supporting means, and fourth, to return the carriage thereby uncoupling said arms from said deposited holders and coupling them to other holders respectively during the initial and final portions of the return movement.

2. The construction as in claim 1 in which said carriage is located between parallel rows of stations and said arms are cantilevers, those of some of said elevators project over one of said rows and other arms over the other row.

3. The construction as in claim 2 in which said mechanism simultaneously raises the elevators for the arms projecting over one row and lowers the elevators having arms projecting over the other of said rows and vice versa.

4. The construction as in claim 3 in which the coupling means on said arms is so positioned that the movement of the carriage in one direction advances the work in the same direction in one of said rows while the work is stationary on its supports in the other row and the return movement of said carriage advances the work in the direction thereof in the last mentioned row while the work is stationary on its supports in the first row.

5. The construction as in claim 4 in which said supporting means is formed by spaced parallel rails and said holders include bars extending transversely of and over both rails with the work suspended therefrom between rails.

6. The construction as in claim 5 provided with arcuate supporting rails connecting the corresponding supporting rails of the end containers in both rows of stations, and means actuated by said carriage for advancing work holders over said arcuate rails from one row to the other.

7. The construction as in claim 6 in which said advancing means is an arcuate transfer carriage, an arcuate supporting rail from which said transfer carriage is travellingly suspended, a connecting rod between the first mentioned carriage and said arcuate carriage, and dogs on said arcuate carriage for successively advancing work holders over said arcuate supporting rails.

8. A series of open top containers for holding treating material, a track extending longitudinally of the series at one side thereof and adjacent to the face of said containers, a carriage travellingly supported on said track to be intermittently moved back and forth thereon for a limited distance, being of a length to overlap all of said containers, elevators on said carriage, one opposite each container and including a vertically extending rod, an arm extending from the upper end of each rod over the adjacent container to clear the upper end thereof in the lowermost position of said elevator, a plurality of work suspension holders, supporting means over each container for one or more of said holders with the suspended work thereon immersed in the material in the containers, means on each arm for automatically coupling with and uncoupling from a work holder while the latter is resting on said supporting means during portions of the movement of said carriage, and mechanism for intermittently and alternately actuating said carriage and elevators and each alternately in opposite directions, said mechanism being timed to, first, simultaneously move upward all elevators which are coupled with work holders, second, to advance said carriage thereby transferring some of said holders from above one container to above another, third, to lower said raised elevators to deposit the holders carried thereby on said supporting means, and fourth, to return said carriage thereby uncoupling said arms from said deposited holders and coupling them to other holders respectively during the initial and final portions of said return movement.

9. The construction as in claim 8 in which said elevator arms, when in raised position, are above the remaining structure.

10. The construction as in claim 8 having two parallel rows of containers mounted on a common base and spaced for said carriage and rails therebetween.

11. The construction as in claim 10 in which said carriage is a skeleton frame and each of said elevator rods is a rack bar having a gear wheel in mesh therewith, and an actuating shaft for an aligned series of gear wheels mounted on the carriage frame for the simultaneous actuation of all of said elevators.

12. The construction as in claim 11 in which pairs of elevator rack bars are arranged with their members respectively on opposite sides of said gear wheels and with their arms extending respectively the two rows of containers, whereby when the rods on one side are raised those on the opposite side will be lowered.

13. A series of open top containers arranged in two opposite parallel rows, a carriage between said rows extending substantially the length thereof, work suspension holders, members mounted on said carriage opposite said containers for simultaneously advancing said holders along the series by movement of said carriage in the same direction, elevators on said carriage for certain of said members lifting the same with their holders and suspended work to clear said containers in transfer from one to another, and other of said members advancing holders in lowered position with the work thereof depending into said containers each of said elevators including a vertical rod movable upward above said carriage, an arm projecting from the upper end of each rod laterally over the adjacent station, and means for simultaneously raising the elevators for one row and lowering those for the other row, whereby their loads will substantially counterbalance each other, both statically and dynamically.

14. A series of open top containers in two parallel spaced rows, a reciprocatory carriage extending between said rows to overlap said containers, work suspension holders, supporting means for said holders above said containers, means on said carriage for advancing said holders along the series in both rows, those in the first row being advanced during the forward movement of said carriage and those in the second row during its return movement, an arcuately moving transfer carrier between adjacent ends of said rows, and an actuating connection between said carriage and said carrier for moving the latter towards said first row during forward movement of said carriage to receive the foremost of said advancing holders in said row, and during return movement of said carriage moving said carrier towards said second row.

15. In apparatus for successively advancing work step by step through a series of processing stations arranged in two opposite parallel rows and including a carriage between said rows extended to overlap each station, being intermittently movable back and forth through a limited distance to advance work in one direction in one row during its forward movement and in the opposite direction in the other row during its return movement; elevators on said carriage opposite each station, each elevator having a cantilever arm extending from its upper end over the station and engageable with work to raise the same for clearance in passing from one station to the next, and means for simultaneously raising the elevators for one row and lowering those for the other, whereby their loads will substantially counterbalance each other, both statically and dynamically.

16. An automatic conveying apparatus comprising a series of processing stations arranged in two opposite parallel rows, a carriage between said rows extending substantially the length thereof, means for reciprocating said carriage through a limited distance to advance the work in one direction in one row during its forward movement and in the opposite direction in the other row during its return movement, elevators on said carriage opposite certain stations, each elevator having a cantilever arm extending from its upper end over the station and engageable with work to raise the same for clearance in passing from one station to the next, and means for simultaneously raising the elevators for one row and lowering those of the other.

17. Apparatus for subjecting a continuous stream of separate work pieces to a series of successive treatments comprising a series of open top containers for treating fluids being of variable lengths and arranged in two parallel rows, a carriage between said rows extended to overlap all of said containers, means for reciprocating said carriage for a predetermined distance with a short interval of rest at each end of its movement and with a length of movement substantially equal to the minimum length of said containers, suspension holders for the work, supporting means for said holders over each container positioned to immerse the suspended work in the fluid therein, elevators on said carriage, one opposite each container of each row, a cantilever arm extending from each elevator over the adjacent container, coupling means at the free end of each arm for engaging a work holder while resting on said supporting means during carriage movement in one direction and for disengaging therefrom during said movement in the opposite direction, means for simultaneously operating all of said elevators during said intervals of rest of said carriage, raising all elevators in one row during the rest interval at one end of the reciprocation and lowering the same during the rest interval at the opposite end of the reciprocation and reversing these movements in the other row, whereby the work is transferred from container to container, additional means for advancing said work holders while resting on said supporting means in the containers of more than minimum lengths and with the work immersed in the treating fluid from the point of deposit of the holder by one elevator to the point for raising the same by another elevator, said means being actuated step by step by successive reciprocations of said carriage whereby the length of treatment of the work in each container is determined by the length of the container.

References Cited in the file of this patent

UNITED STATES PATENTS

| 996,290 | Steele | June 27, 1911 |
| 1,401,743 | Sperry | Dec. 27, 1921 |
| 1,634,849 | Powell | July 5, 1927 |
| 2,711,993 | Lyon | June 28, 1955 |

FOREIGN PATENTS

| 729,019 | France | Apr. 19, 1932 |